US010576482B2

(12) United States Patent
Mima et al.

(10) Patent No.: US 10,576,482 B2
(45) Date of Patent: Mar. 3, 2020

(54) COATING DEVICE

(71) Applicant: HONDA MOTOR CO., LTD., Tokyo (JP)

(72) Inventors: Hirofumi Mima, Tochigi (JP); Masaaki Shoji, Tochigi (JP); Koji Ikeda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 50 days.

(21) Appl. No.: 16/076,419

(22) PCT Filed: Feb. 7, 2017

(86) PCT No.: PCT/JP2017/004415
§ 371 (c)(1),
(2) Date: Aug. 8, 2018

(87) PCT Pub. No.: WO2017/138531
PCT Pub. Date: Aug. 17, 2017

(65) Prior Publication Data
US 2019/0039080 A1 Feb. 7, 2019

(30) Foreign Application Priority Data

Feb. 12, 2016 (JP) ................. 2016-024593

(51) Int. Cl.
*B05B 5/04* (2006.01)
*B25J 11/00* (2006.01)
(Continued)

(52) U.S. Cl.
CPC ............... *B05B 5/04* (2013.01); *B05B 5/001* (2013.01); *B05B 5/0415* (2013.01); *B05B 12/00* (2013.01);
(Continued)

(58) Field of Classification Search
CPC ......... B05B 5/001; B05B 5/04; B05B 5/0415; B05B 5/0426; B05B 12/00; B05B 13/0452; B25J 11/0075
See application file for complete search history.

(56) References Cited

U.S. PATENT DOCUMENTS 5,133,499 A * 7/1992 Schneider ................. B05B 5/04
239/104
6,105,886 A * 8/2000 Hollstein ............... B05B 3/1064
239/105

(Continued)

FOREIGN PATENT DOCUMENTS

JP 2001137746 A * 5/2001 ........... B05B 3/1064
JP 2007-061701 3/2007

(Continued)

OTHER PUBLICATIONS

International Search Report, dated Apr. 25, 2017 (Apr. 25, 2017), 2 pages.

*Primary Examiner* — Darren W Gorman
(74) *Attorney, Agent, or Firm* — Rankin, Hill & Clark LLP

(57) ABSTRACT

Provided is a coating device capable of suppressing condensation from forming on a joint ring that connects a robot arm and a rotary atomization head. The joint ring 20 of this coating device 1 has an insulating member 23 which is positioned between a joint ring body 21 and a cover member 22, positioned so as to cover the joint ring body 21, and positioned so as to be separated from the cover member 22 by only a prescribed distance. In addition, the joint ring 20 is equipped with: a first chamber 230 that connects a first discharge port 212 and a second intake port 221, and is formed between the joint ring body 21 and the insulating (Continued)

member 23; and a second chamber 240 formed between the cover member 22 and the insulating member 23.

2 Claims, 6 Drawing Sheets

(51) Int. Cl.
  B05B 5/00 (2006.01)
  B05B 12/00 (2018.01)
  B05B 13/04 (2006.01)
(52) U.S. Cl.
  CPC ......... B25J 11/0075 (2013.01); B05B 5/0426 (2013.01); B05B 13/0452 (2013.01)

(56) References Cited

U.S. PATENT DOCUMENTS

| | | | |
|---|---|---|---|
| 6,972,052 B2 * | 12/2005 | Krumma | B05B 3/001 118/300 |
| 7,325,751 B2 * | 2/2008 | Thome | B05B 5/001 239/124 |
| 7,703,700 B2 | 4/2010 | Yasuda | |
| 7,896,265 B2 * | 3/2011 | Takahashi | B05B 5/0407 239/224 |
| 2006/0175439 A1 | 8/2006 | Steur et al. | |
| 2009/0277378 A1 | 11/2009 | Yamauchi | |
| 2013/0011567 A1 | 1/2013 | Takebe et al. | |
| 2014/0166779 A1 * | 6/2014 | Yamauchi | B05B 3/1035 239/263 |

FOREIGN PATENT DOCUMENTS

| | | |
|---|---|---|
| JP | 2009-045519 | 3/2009 |
| JP | 4705100 | 3/2011 |
| JP | 2017-023890 | 2/2017 |
| WO | 2008/081634 | 7/2008 |
| WO | 2011/037113 | 3/2011 |

* cited by examiner

COATING DEVICE

TECHNICAL FIELD

The present invention relates to a rotary atomization-type coating device.

BACKGROUND ART

Conventionally, for example, a rotary atomization-type coating device is used when an object such as a car body is coated with a coating material such as paint. Here, the rotary atomization-type coating device has an air motor using compressed air and the compressed air used in the air motor is exhausted through the inside of the device with the compressed air released to the atmospheric pressure, and then the surrounding heat may be deprived and the temperature of the device may decrease. Condensation may form on the outer surface of the device as a result.

Proposed in this regard is a device for suppressing condensation from forming on the outer surface of the device by positioning a high-temperature adiabatic air passage on the outside of a discharge air passage (see, for example, Patent Document 1).

Patent Document 1: Japanese Patent No. 4705100

DISCLOSURE OF THE INVENTION

Problems to be Solved by the Invention

However, the coating device disclosed in Patent Document 1 further requires the adiabatic air passage, a drive mechanism for sending adiabatic air, and so on, which may lead to more burden in terms of operation and maintenance. Besides, in the coating device disclosed in Patent Document 1, no measure is taken against condensation on a joint ring, which is a part for connection between a rotary atomization head portion and a robot arm and is most prone to condensation.

An object of the present invention is to provide a coating device capable of suppressing condensation from forming on a joint ring that connects a robot arm and a rotary atomization head portion.

Means for Solving the Problems

The present invention relates to a rotary atomization-type coating device (for example, a coating device 1 to be described later) connected to a robot arm (for example, a robot arm 3 to be described later), and the coating device includes a rotary atomization head portion (for example, a head portion 10 to be described later) including a rotary atomization head (for example, a rotary atomization head 12 to be described later), an air motor (for example, an air motor 11 to be described later) driven by compressed air, and a first exhaust path (for example, a first exhaust path 15 to be described later) for exhausting exhaust air from the air motor, and a joint ring (for example, a joint ring 20 to be described later) connecting the rotary atomization head portion and the robot arm, in which the joint ring includes a body portion (for example, a joint ring body 21 to be described later), a cover member (for example, a cover member 22 to be described later) accommodating the body portion, an insulating member (for example, an insulating member 23 to be described later) which is positioned between the body portion and the cover member, positioned so as to cover the body portion, and positioned so as to be separated from the cover member by only a prescribed distance, a second exhaust path (for example, a second exhaust path 210 to be described later) formed in the body portion and connecting a first intake port (for example, a first intake port 211 to be described later) formed continuously to the first exhaust path and a first discharge port (for example, a first discharge port 212 to be described later) formed at a prescribed position and releasing exhaust, a third exhaust path (for example, a third exhaust path 220 to be described later) formed in the body portion and connecting a second intake port (for example, a second intake port 221 to be described later) formed so as to be separated from the first discharge port and a second discharge port (for example, a second discharge port 222 to be described later) formed continuously to the robot arm and discharging exhaust air to the robot arm side, a first chamber (for example, a first chamber 230 to be described later) connecting the first discharge port and the second intake port and formed between the body portion and the insulating member, and a second chamber (for example, a second chamber 240 to be described later) formed between the cover member and the insulating member.

The joint ring of the coating device according to the present invention includes the insulating member which is positioned between the body portion and the cover member, positioned so as to cover the body portion, and positioned so as to be separated from the cover member by only a prescribed distance. In addition, the joint ring of the coating device according to the present invention is equipped with: the first chamber that connects the first discharge port and the second intake port, and is formed between the body portion and the insulating member; and the second chamber formed between the cover member and the insulating member. As a result, the insulating member and the second chamber formed between the insulating member and the cover member are positioned between the first chamber and the cover member, and thus, even if the temperature in the first chamber lowers, the cover member can be suppressed from being affected thereby. Accordingly, the joint ring of the coating device according to the present invention is capable of suppressing temperature reduction in the cover member, and thus is capable of suppressing condensation from forming on the outer surface of the cover member.

Preferably, the joint ring of the coating device according to the present invention further includes an air supply unit (for example, an air supply unit 250 to be described later) capable of air-purging the second chamber. As a result, the joint ring of the coating device according to the present invention is capable of, for example, sending normal- or higher-temperature air into the second chamber and pushing out the air staying therein. Accordingly, the joint ring of the coating device according to the present invention is capable of further suppressing temperature reduction in the second chamber. As a result, the joint ring of the coating device according to the present invention is capable of further suppressing temperature reduction in the cover member, and thus is capable of more reliably suppressing condensation from forming on the outer surface of the cover member.

Effects of the Invention

According to the present invention, a coating device can be provided that is capable of suppressing condensation from forming on a joint ring that connects a robot arm and a rotary atomization head portion.

PREFERRED MODE FOR CARRYING OUT THE INVENTION

Figure 1:
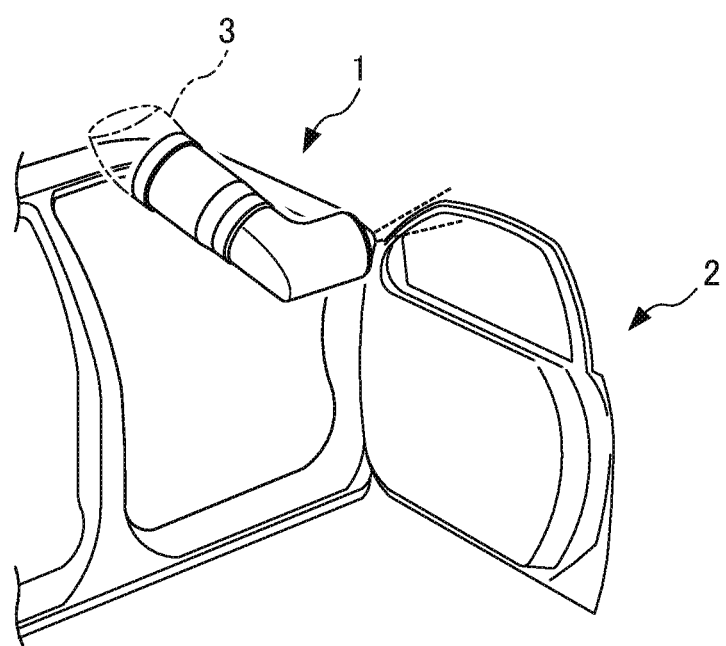
FIG. 1 is a diagram illustrating a state in which a coating device according to an embodiment of the present invention is connected to a robot arm.
Figure 2:
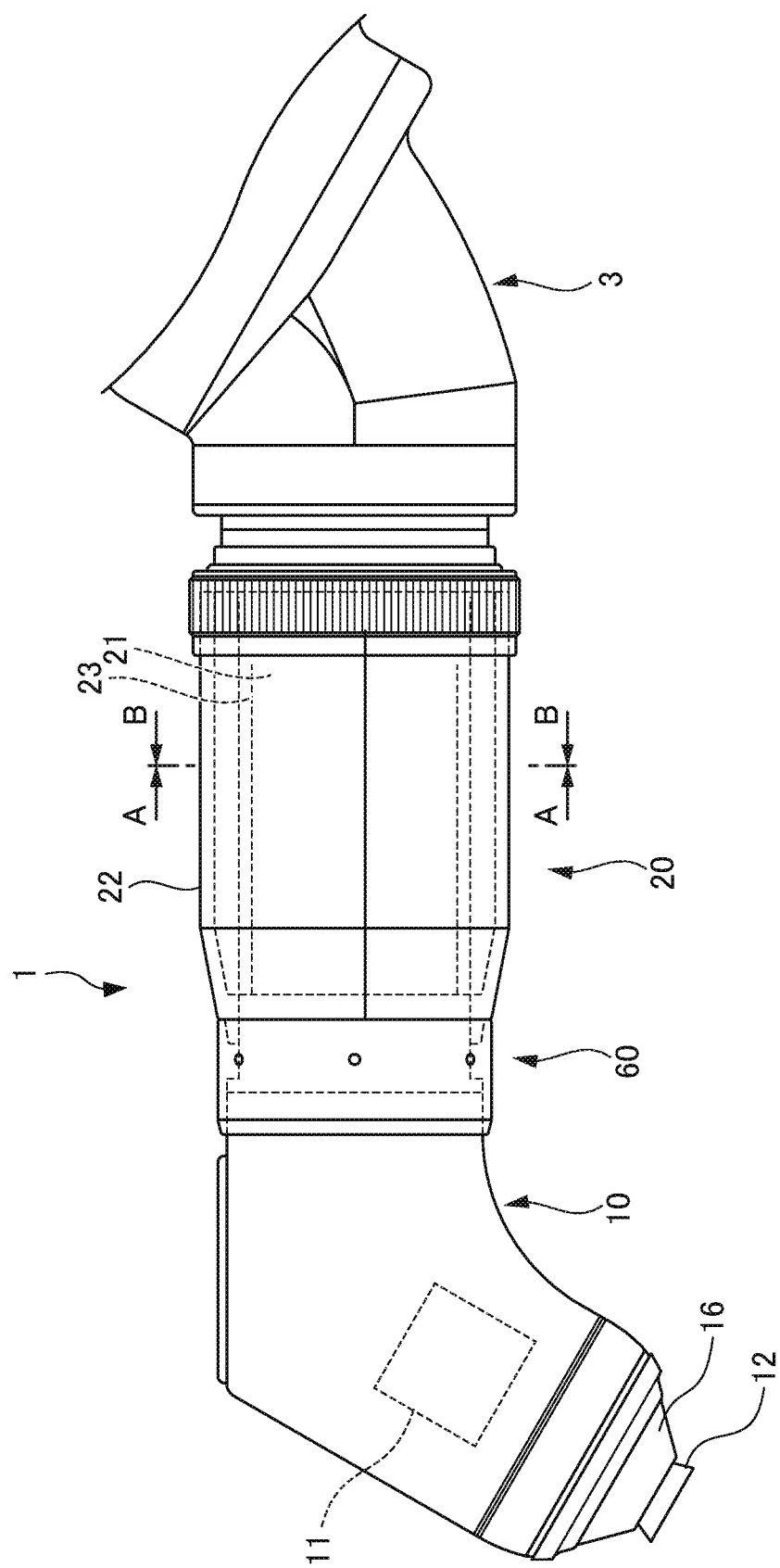
FIG. 2 is a side view of the coating device according to an embodiment of the present invention.
Figure 3:
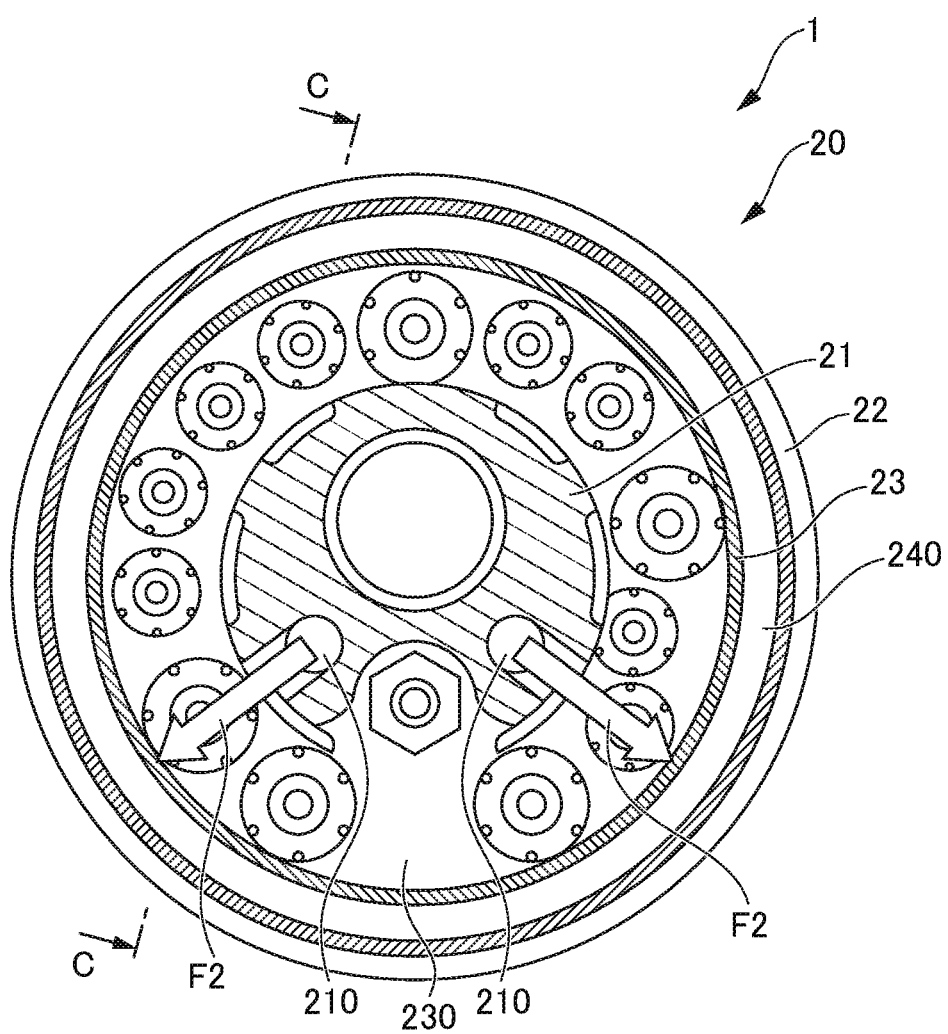
FIG. 3 is a sectional view taken along line A-A of FIG. 2.
Figure 4:
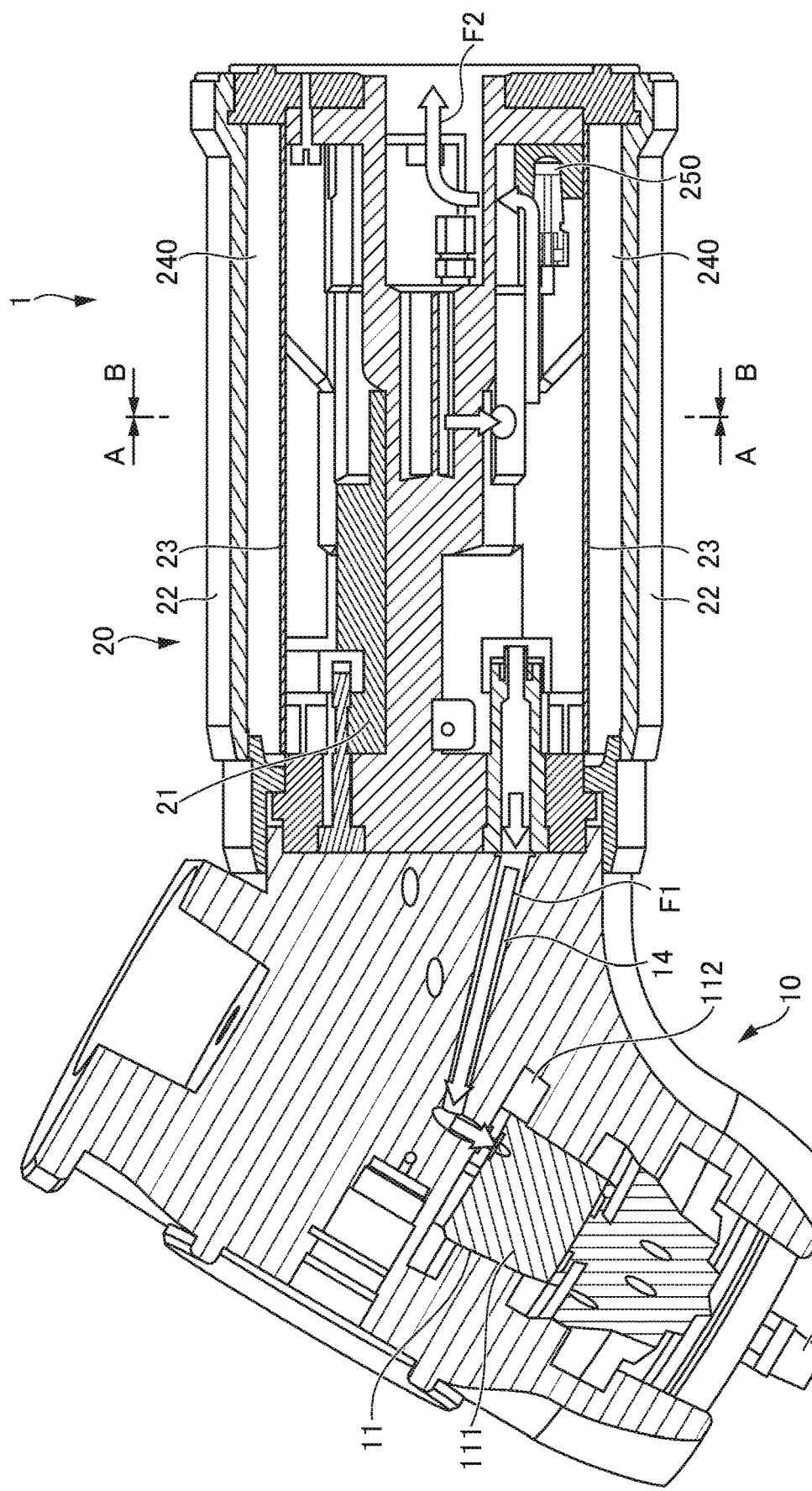
FIG. 4 is a sectional view in which the coating device according to an embodiment of the present invention is taken along line C-C of FIG. 3.
Figure 5:
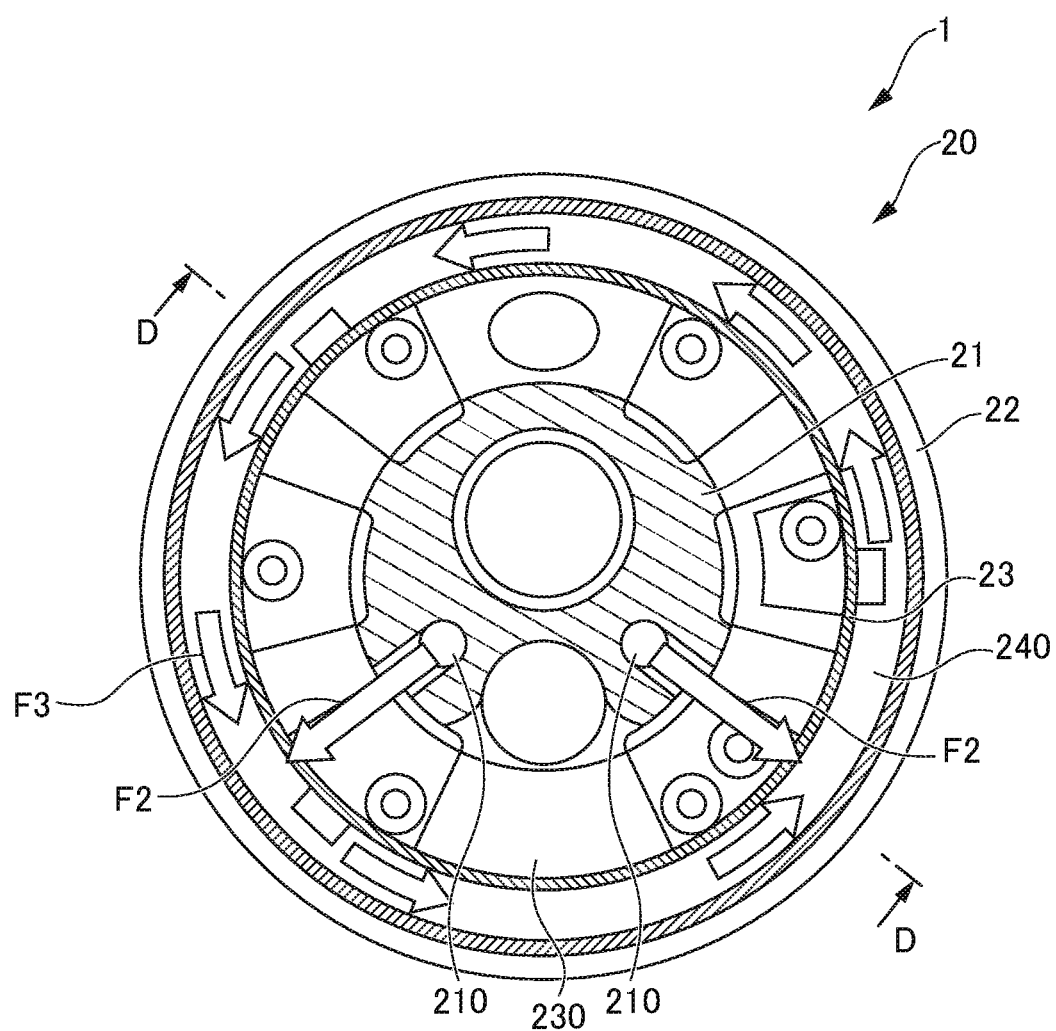
FIG. 5 is a sectional view taken along line B-B of FIG. 2.
Figure 6:
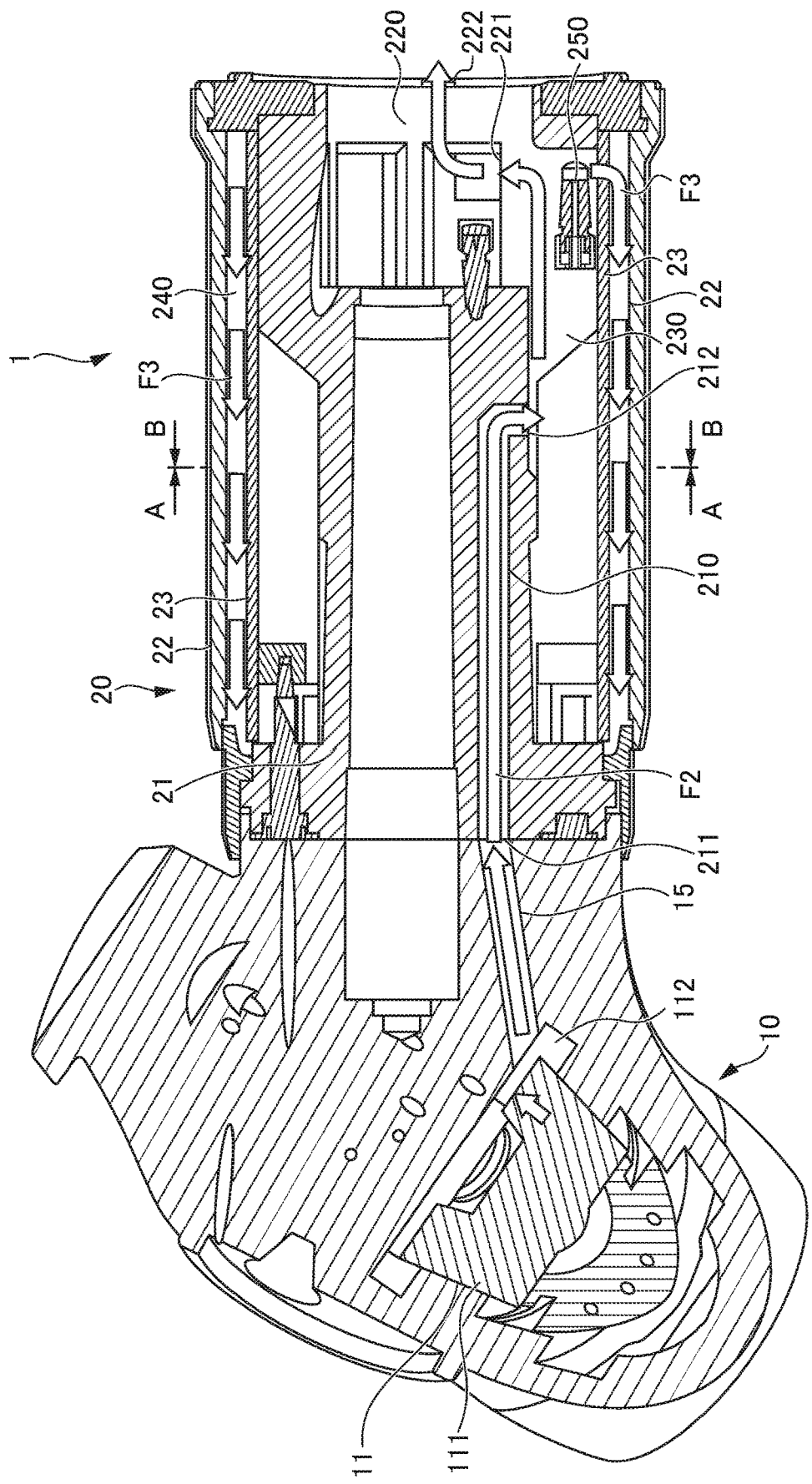
FIG. 6 is a sectional view in which the coating device according to an embodiment of the present invention is taken along line D-D of FIG. 5.

Hereinafter, a coating device according to an embodiment of the present invention will be described with reference to accompanying drawings. The configuration of a coating device 1 according to the present embodiment will be described with reference to FIGS. 1 to 6. Here, FIG. 1 is a diagram illustrating a state in which the coating device according to an embodiment of the present invention is connected to a robot arm. FIG. 2 is a side view of the coating device according to an embodiment of the present invention. FIG. 3 is a sectional view taken along line A-A of FIG. 2. FIG. 4 is a sectional view taken along line C-C of FIG. 3. FIG. 5 is a sectional view taken along line B-B of FIG. 2. FIG. 6 is a sectional view taken along line D-D of FIG. 5. Incidentally, in FIGS. 4 and 6, description of a rotary atomization head 12 and a shaping air ring 16, which will be described later, is omitted.

As illustrated in FIG. 1, the coating device 1 is connected to the tip of a robot arm 3. The coating device 1 is, for example, a device for coating a body 2 of a car.

As illustrated in FIG. 2, the coating device 1 has a head portion 10 (rotary atomization head portion) and a joint ring 20. As illustrated in FIG. 2, the head portion 10 is a substantially L-shaped part that has a bent tip part. The head portion 10 is detachably attached to the tip of the head portion 10 by a connecting portion 60.

As illustrated in FIGS. 4 and 6, the head portion 10 includes an air motor 11, the rotary atomization head 12 driven to rotate by the air motor 11, a compressed air supply path 14 for supplying compressed air to the air motor 11, a first exhaust path 15 for discharging exhaust air F2 from the air motor 11, and the shaping air ring 16.

The air motor 11 is positioned inside the head portion 10. The rotary atomization head 12 is driven to rotate by the air motor 11. The air motor 11 includes an air motor body 111 and an air motor exhaust chamber 112.

The air motor body 111 is driven to rotate by the compressed air supplied by the compressed air supply path 14. The air motor body 111 has a rotary shaft 110 on the tip side thereof, and the rotary shaft 110 is connected to the rotary atomization head 12 so as to be capable of directly or indirectly transmitting a rotational driving force.

The air motor exhaust chamber 112 is a space part where the exhaust air F2 is discharged from the air motor body 111, and the exhaust air F2 is the compressed air that is decompressed after being used for the rotational driving of the air motor body 111. The air motor exhaust chamber 112 stores the exhaust air F2 by only a prescribed amount with the temperature of the exhaust air F2 lowered. The exhaust air F2 exhausted to the air motor exhaust chamber 112 is exhausted to the first exhaust path 15.

The rotary atomization head 12 is positioned at the tip of the head portion 10. The rotary atomization head 12 has a substantially conical shape in which the inner diameter thereof increases toward the tip side. The rotary atomization head 12 is driven to rotate by the air motor 11. The rotary atomization head 12 is positioned so as to be rotatable around the rotary shaft 110. The rotary atomization head 12 rotates in a state in which a high voltage is applied by a high voltage applying device (not illustrated), thereby charging, jetting, and atomizing paint.

The compressed air supply path 14 is a supply path for supplying compressed air to the air motor 11. The compressed air supply path 14 supplies the air motor 11 with compressed air supplied by a compressed air supply unit (not illustrated).

The first exhaust path 15 is an exhaust path for discharging the exhaust air F2 from the air motor 11 and discharges the exhaust air F2 from the air motor exhaust chamber 112. The first exhaust path 15 is an exhaust path formed to be connected to a second exhaust path 210 (described later) and sending the exhaust air F2 to the joint ring 20 side.

The shaping air ring 16 is positioned at the tip of the head portion 10 so as to surround the rotary atomization head 12. The shaping air ring 16 has a plurality of shaping air injection ports (not illustrated) formed so as to surround the rotary atomization head 12, and the coating pattern of the paint that is jetted from the rotary atomization head 12 and atomized is regulated by the shaping air that is jetted from the shaping air injection ports.

As illustrated in FIG. 2, the joint ring 20 is positioned between the robot arm 3 and the head portion 10. The joint ring 20 connects the robot arm 3 and the head portion 10. The joint ring 20 is attached to the tip of the robot arm 3. In the present embodiment, the joint ring 20 is cylindrical.

As illustrated in FIGS. 2 to 6, the joint ring 20 includes a joint ring body 21 (body portion), a cover member 22, an insulating member 23, a first chamber 230, a second chamber 240, and an air supply unit 250.

The joint ring body 21 is positioned inside the cover member 22 and the insulating member 23. A plurality of tubes (not illustrated) constituting various paths are connected to the joint ring body 21. In addition, the joint ring body 21 has the second exhaust path 210 and a third exhaust path 220.

The second exhaust path 210 is formed in the joint ring body 21. The second exhaust path 210 is formed to be connected to the first exhaust path 15 formed in the head portion 10. The second exhaust path 210 is an exhaust path that connects a first intake port 211 formed continuously to the first exhaust path 15 and a first discharge port 212 formed at a predetermined position and releasing the exhaust air F2 (exhaust air).

The exhaust air F2 from the first exhaust path 15 is sent to the second exhaust path 210. The exhaust air F2 having a temperature lower than the temperature of compressed air F1 is sent to the second exhaust path 210. The exhaust air F2 sent to the second exhaust path 210 is released to the atmosphere in the first chamber 230 (described later).

The third exhaust path 220 is formed in the joint ring body 21. The third exhaust path 220 is formed to be connected to the first chamber 230 (described later). The third exhaust path 220 is an exhaust path that connects a second intake port 221 formed continuously to the first chamber 230 and a second discharge port 222 formed continuously to the robot arm 3 and discharging the exhaust air F2 to the robot arm 3 side. The second intake port 221 is formed so as to be separated from the first discharge port 212.

The exhaust air F2 from the first chamber 230 is sent to the third exhaust path 220. The exhaust air F2 having a temperature lower than the temperature of the compressed air F1 is sent to the third exhaust path 220. The exhaust air F2 sent to the third exhaust path 220 is sent to the robot arm 3 side.

The cover member 22 is a member accommodating the joint ring body 21. The cover member 22 is a cylindrical member. In the present embodiment, the cover member 22 is positioned so as to cover the outside of the joint ring body 21 and the insulating member 23. The cover member 22 is positioned outside the outer surface of the insulating member 23 by only a prescribed distance. The cover member 22 forms the second chamber 240 (described later) together with the insulating member 23.

The insulating member 23 is an insulating member positioned between the joint ring body 21 and the cover member 22. The insulating member 23 is positioned so as to cover the joint ring body 21 and is positioned so as to be separated from the cover member 22 by only a prescribed distance. The insulating member 23 is a cylindrical member and is positioned so as to surround the joint ring body 21 in a cross section (see FIGS. 3 and 5). In addition, the insulating member 23 is positioned inside the cover member 22. The insulating member 23 is positioned inside the cover member 22 so as to be separated from the cover member 22 by only a prescribed distance.

The insulating member 23 forms the first chamber 230 together with the joint ring body 21. In addition, the insulating member 23 forms the second chamber 240 together with the cover member 22.

The first chamber 230 is a space portion for connecting the first discharge port 212 and the second intake port 221. The first chamber 230 is formed between the joint ring body 21 and the insulating member 23. The first chamber 230 is configured so as not to be connected to 240 by the insulating member 23. The first chamber 230 is a space portion through which the exhaust air F2 from the second exhaust path 210 is released to the atmosphere. The first chamber 230 is a space that has an internal temperature lowered by the exhaust air F2. The exhaust air F2 sent to the first chamber 230 is sent to the third exhaust path 220 via the second intake port 221.

The second chamber 240 is a space formed between the cover member 22 and the insulating member 23. The second chamber 240 is a space portion for suppressing the cover member 22 from being affected by a temperature change in the first chamber 230. The second chamber 240 suppresses a decline in temperature in the cover member 22 together with the insulating member 23 even when the temperature of the joint ring body 21 and the first chamber 230 is lowered. As a result, the second chamber 240 is capable of suppressing condensation from forming on the outer surface of the cover member 22.

The air supply unit 250 is configured to be capable of performing air purge on the second chamber 240. The air supply unit 250 can be formed by, for example, branching of an air supply path for air-purging a paint applying nozzle or the like. The air supply unit 250 air-purges the second chamber 240 continuously or at predetermined intervals. It is preferable that the air supply unit 250 air-purges the second chamber 240 with normal- or higher-temperature air. Here, the normal temperature is the ambient temperature at which the coating device is positioned.

As a result, temperature reduction in the second chamber 240 is suppressed. Since temperature reduction in the second chamber 240 can be suppressed, the second chamber 240 is capable of more preferably suppressing condensation from forming on the outer surface of the cover member 22.

The flow of exhaust air in the coating device 1 will be described below. First, as illustrated in FIG. 4, the compressed air F1 is supplied to the air motor 11 via the compressed air supply path 14 by the compressed air supply unit (not illustrated). The compressed air F1 supplied to the air motor 11 causes the air motor 11 to be driven to rotate, is decompressed, and is sent to the air motor exhaust chamber 112.

Subsequently, as illustrated in FIG. 6, the exhaust air F2 in the air motor exhaust chamber 112 passes through the first exhaust path 15 and is sent to the second exhaust path 210 formed in the joint ring body 21. Here, the exhaust air F2 with a temperature lowered as a result of decompression lowers the temperature of the joint ring body 21.

Subsequently, as illustrated in FIGS. 3, 5, and 6, the exhaust air F2 in the second exhaust path 210 is released to the atmosphere in the first chamber 230. Here, the exhaust air F2 with a temperature lowered as a result of decompression lowers the temperature in the first chamber 230.

However, the insulating member 23 and the second chamber 240 formed between the insulating member 23 and the cover member 22 are positioned between the first chamber 230 and the cover member 22. Therefore, even if the temperature in the first chamber 230 lowers, the cover member 22 is suppressed from being affected thereby. In other words, temperature reduction in the cover member 22 is suppressed.

Furthermore, the second chamber 240 is air-purged by the air supply unit 250. As illustrated in FIGS. 3, 5, and 6, air F3 supplied by the air supply unit 250 is sent into the second chamber 240, and the air staying therein is pushed out from, for example, a penetration point (not illustrated). As a result, temperature reduction in the second chamber 240 is further suppressed. As a result, temperature reduction in the cover member 22 is more preferably suppressed.

Subsequently, as illustrated in FIG. 6, the exhaust air F2 in the first chamber 230 is exhausted to the robot arm 3 side via the third exhaust path 220. As a result, the exhaust air F2 is exhausted from the head portion 10 to the robot arm 3 side via the joint ring 20.

The following effects are obtained from the above-described first to third embodiments. In the present embodiment, the coating device 1 (joint ring 20) has the insulating member 23 which is positioned between the joint ring body 21 and the cover member 22, positioned so as to cover the joint ring body 21, and positioned so as to be separated from the cover member 22 by only a prescribed distance. In addition, the coating device 1 (joint ring 20) is equipped with: the first chamber 230 that connects the first discharge port 212 and the second intake port 221, and is formed between the joint ring body 21 and the insulating member 23; and the second chamber 240 formed between the cover member 22 and the insulating member 23.

As a result, in the coating device 1 (joint ring 20), the insulating member 23 and the second chamber 240 formed between the insulating member 23 and the cover member 22 are positioned between the first chamber 230 and the cover member 22. Therefore, even if the temperature in the first chamber 230 lowers, the coating device 1 (joint ring 20) is capable of suppressing the cover member 22 from being affected thereby. The coating device 1 (joint ring 20) is configured to be capable of suppressing temperature reduction in the cover member 22. As a result, the coating device 1 (joint ring 20) is capable of suppressing condensation from forming on the outer surface of the cover member 22.

The coating device 1 (joint ring 20) further includes the air supply unit 250 capable of performing air purge on the second chamber 240. As a result, the coating device 1 (joint ring 20) is capable of, for example, sending normal- or higher-temperature air into the second chamber 240 and pushing out the air staying therein. Accordingly, the coating device 1 (joint ring 20) is capable of more preferably suppressing temperature reduction in the second chamber 240. As a result, the coating device 1 (joint ring 20) is capable of more preferably suppressing temperature reduction in the cover member 22. As a result, the coating device 1 (joint ring 20) is capable of more preferably suppressing condensation from forming on the outer surface of the cover member 22.

The present invention is not limited to the above-described embodiments, but includes variations, improvements, and the like within the scope of achieving the object of the present invention. Although the coating device according to the present embodiment performs air purge with normal- or higher-temperature air by the second chamber, the present invention is not limited thereto and, for example, air with a temperature that is lower than the normal temperature yet unlikely to cause condensation may be supplied instead.

In addition, although the coating device according to the present embodiment further includes the air supply unit capable of air-purging the second chamber, the present invention is not limited thereto and the coating device may have no air purge function instead. Even in this case, the coating device is capable of suppressing condensation from forming. Further, embodiments in which the above-described first to third embodiments are appropriately combined are also included in the present invention.

EXPLANATION OF REFERENCE NUMERALS

1 COATING DEVICE
10 HEAD PORTION
11 AIR MOTOR
12 ROTARY ATOMIZATION HEAD
15 FIRST EXHAUST PATH
20 JOINT RING
21 JOINT RING BODY
22 COVER MEMBER
23 INSULATING MEMBER
210 SECOND EXHAUST PATH
211 FIRST INTAKE PORT
212 FIRST EXHAUST PORT
220 THIRD EXHAUST PATH
221 SECOND INTAKE PORT
222 SECOND EXHAUST PORT
230 FIRST CHAMBER
240 SECOND CHAMBER
250 AIR SUPPLY UNIT

The invention claimed is:

1. A rotary atomization-type coating device connected to a robot arm, the coating device comprising:
 a rotary atomization head portion including a rotary atomization head, an air motor driven by compressed air, and a first exhaust path for exhausting exhaust air from the air motor; and
 a joint ring connecting the rotary atomization head portion and the robot arm, wherein the joint ring includes:
 a body portion;
 a cover member accommodating the body portion;
 an insulating member which is positioned between the body portion and the cover member, positioned so as to cover the body portion, and positioned so as to be separated from the cover member by only a prescribed distance;
 a second exhaust path formed in the body portion and connecting a first intake port formed continuously to the first exhaust path and a first discharge port formed at a prescribed position and releasing exhaust;
 a third exhaust path formed in the body portion and connecting a second intake port formed so as to be separated from the first discharge port and a second discharge port formed continuously to the robot arm and discharging exhaust air to the robot arm side;
 a first chamber connecting the first discharge port and the second intake port and formed between the body portion and the insulating member; and
 a second chamber formed between the cover member and the insulating member.

2. The coating device according to claim 1, further comprising an air supply unit capable of air-purging the second chamber.

* * * * *